(12) United States Patent
Ari

(10) Patent No.: US 9,670,969 B2
(45) Date of Patent: Jun. 6, 2017

(54) DRIVE ASSEMBLY FOR A MOTOR VEHICLE DRIVE TRAIN INCLUDING A DYNAMICALLY COMPENSATED CLUTCH CONTROL ASSEMBLY

(71) Applicant: Schaeffler Technologies AG & Co. KG, Herzogenaurach (DE)

(72) Inventor: Vural Ari, Lynnfield, MA (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 96 days.

(21) Appl. No.: 14/678,794

(22) Filed: Apr. 3, 2015

(65) Prior Publication Data

US 2015/0285316 A1    Oct. 8, 2015

Related U.S. Application Data

(60) Provisional application No. 61/976,961, filed on Apr. 8, 2014.

(51) Int. Cl.
| | |
|---|---|
| *F16D 25/02* | (2006.01) |
| *F16D 25/0638* | (2006.01) |
| *F16D 25/12* | (2006.01) |
| *F16D 23/12* | (2006.01) |

(52) U.S. Cl.
CPC ......... *F16D 25/0638* (2013.01); *F16D 25/02* (2013.01); *F16D 25/126* (2013.01); *F16D 2023/123* (2013.01)

(58) Field of Classification Search
CPC ........ F16D 25/02; F16D 25/06–25/065; F16D 25/12; F16D 25/126
USPC .......... 192/85.02, 58.25, 85.26, 85.62, 85.25
See application file for complete search history.

(56) References Cited

U.S. PATENT DOCUMENTS

| | | | |
|---|---|---|---|
| 5,106,348 A * | 4/1992 | Koivunen | F16D 25/02 192/48.614 |
| 6,716,128 B2 * | 4/2004 | Kuramoto et al. | F16D 25/02 192/45.005 |
| 2012/0234646 A1 | 9/2012 | Hemphill | |

\* cited by examiner

*Primary Examiner* — Richard Lorence
(74) *Attorney, Agent, or Firm* — Davidson, Davidson & Kappel, LLC

(57) ABSTRACT

A drive assembly for a motor vehicle drive train is provided. The drive assembly includes a clutch pack, a hub, a main piston axially movable with respect to the hub to engage the clutch pack and a clutch control assembly nonrotatably fixed to the hub. The clutch control assembly forms a pressure chamber with the main piston. Rotation of the hub causes the clutch control assembly to close an engagement gap of the clutch pack. Pressure in the pressure chamber moves the main piston to engage the clutch pack after the engagement gap is closed.

19 Claims, 2 Drawing Sheets

DRIVE ASSEMBLY FOR A MOTOR VEHICLE DRIVE TRAIN INCLUDING A DYNAMICALLY COMPENSATED CLUTCH CONTROL ASSEMBLY

This claims the benefit to U.S. Provisional Patent Application No. 61/976,961, filed on Apr. 8, 2014, which is hereby incorporated by reference herein.

The present disclosure relates generally to drive assemblies for motor vehicle drive trains and more specifically to drive assemblies including clutch control assemblies.

BACKGROUND

U.S. Pub. 2012/0234646 discloses a clutch control assembly 200 for a transmission, a front perspective exploded view of which is shown in FIG. 1. Clutch control assembly 200 includes a piston plate 202, an adjuster ring 204 and rotary pistons 206. Rotary pistons 206 are connected to adjuster ring 204 by respective axial protrusions 208 extending axially away from adjuster ring 204. Upon rotation of clutch control assembly 200, rotary pistons 206, which hold springs 210 on their outer surfaces and extend circumferentially into belled sections 212 of piston plate 202, compress springs 210 and urge adjuster ring 204 in a circumferential direction such that circumferentially aligned and axially extending ramps 214 of adjuster ring 204 slide along circumferentially aligned and axially extending ramps 216 of piston plate 202, causing adjuster ring 204 to move axially away from piston plate 202 to engage a clutch.

SUMMARY OF THE INVENTION

According to a first aspect of the invention, a drive assembly for a motor vehicle drive train is provided that includes a clutch pack, a hub, a main piston axially movable with respect to the hub to engage the clutch pack and a clutch control assembly nonrotatably fixed to the hub. The clutch control assembly forms a pressure chamber with the main piston. Rotation of the hub causes the clutch control assembly to close an engagement gap of the clutch pack. Pressure in the pressure chamber moves the main piston to engage the clutch pack after the engagement gap is closed.

According to a second aspect of the invention, a drive assembly for a motor vehicle drive train is provided that includes a clutch control assembly including a piston plate and an adjuster ring. Rotation of the piston plate causes the adjuster ring to move axially away from the piston plate a predefined maximum distance. The drive assembly also includes an adjuster ring compensation dam forming a compensation pressure region with the adjuster ring. The compensation pressure region is designed to dynamically compensate for an increase in pressure in the pressure chamber caused by rotation of the drive assembly.

According to a third aspect of the invention, a drive assembly for a motor vehicle drive train is provided that includes a piston plate and an adjuster ring for engaging the piston plate. At least one of the piston plate and the adjuster ring including at least one circumferentially aligned and axially extending piston ramp. The drive assembly further includes at least one rotary piston fixed to the adjuster ring. In response to a pressure applied to the piston plate and to the at least one rotary piston, the at least one rotary piston is displaceable to urge the adjuster ring in a first circumferential direction via the at least one ramp such that the adjuster ring displaces axially away from the piston plate. The drive assembly further includes an adjuster ring compensation dam forming a compensation pressure region with the adjuster ring for controlling the axial displacement of the adjuster ring away from the piston plate.

BRIEF DESCRIPTION OF THE DRAWINGS

The present invention is described below by reference to the following drawings, in which.

DETAILED DESCRIPTION

The present disclosure provides an improvement of the clutch control assembly disclosed in U.S. Pub. 2012/0234646 by providing a drive assembly with a dynamically compensated clutch control assembly.

Figure 2:
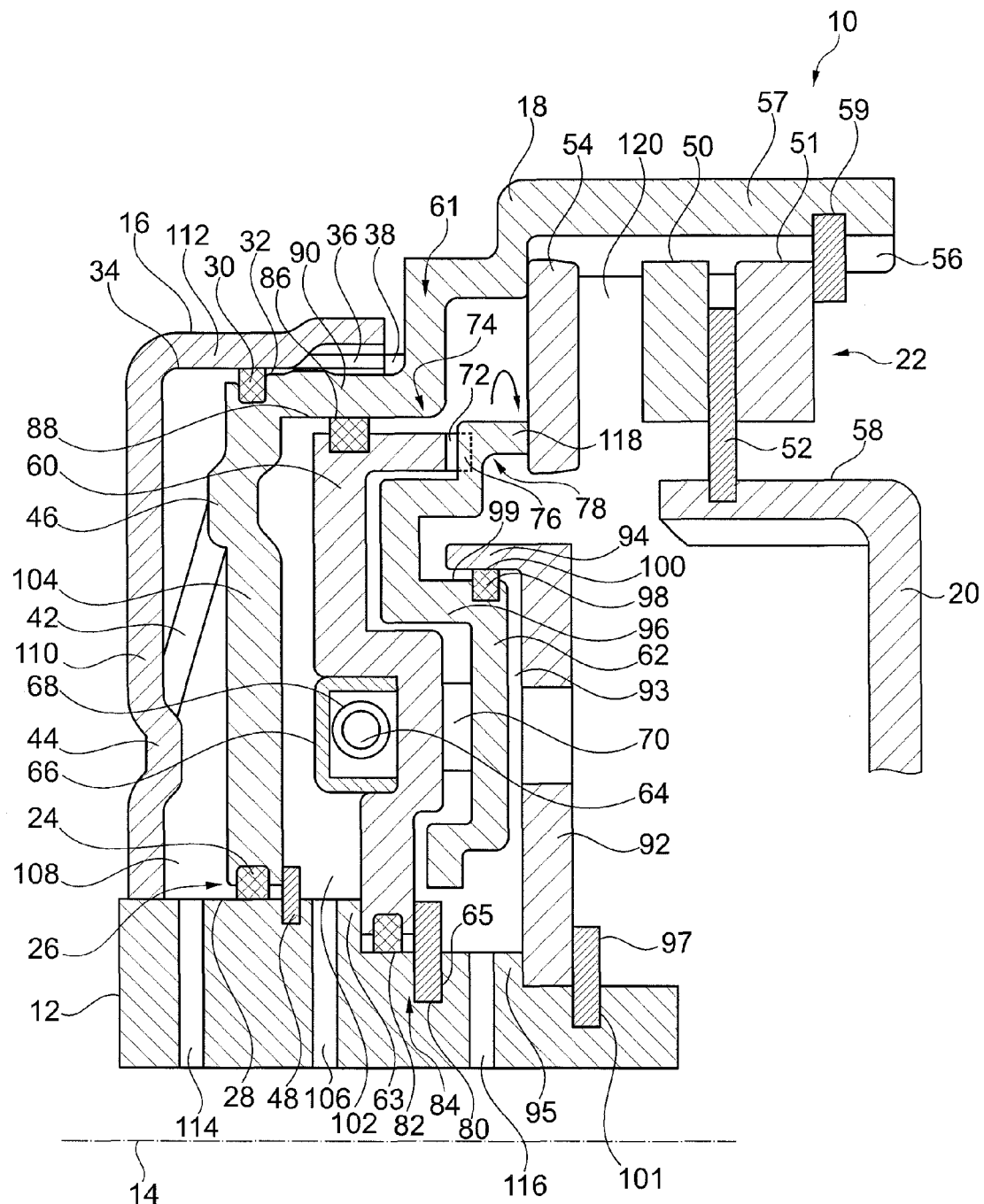
FIG. 2 shows a cross-sectional side view of a drive assembly in accordance with an embodiment of the present invention.

FIG. 2 shows a drive assembly 10 for a motor vehicle drive train in accordance with an embodiment of the present invention. Drive assembly 10 includes a hub 12 rotatable about an axis 14. A torque input component in the form of a main piston compensation dam 16 is provided for transferring torque to a main piston 18, which transfers the torque to a torque output component in the form of a clutch carrier 20, when a clutch pack 22 is engaged. Main piston 18 is axially slidable with respect to compensation dam 16 and hub 12 and compensation dam 16 is axially and nonrotatably fixed to hub 12. Main piston 18 is provided with an inner radial seal 24 on an inner radial end 26 thereof for axially sliding along an outer radial surface 28 of hub 12 and an outer radial seal 30 at an outer radial surface 32 thereof for axially sliding along an inner radial surface 34 of compensation dam 16. Main piston 18 and dam 16 are nonrotatably connected to each other for transferring torque therebetween by matching splines 36, 38, which includes dam splines 36 on inner radial surface 34 of dam 16 and piston splines 38 on outer radial surface 32 of main piston 18. Main piston 18 and dam 16 may also be nonrotatably connected to each other by a return spring 42 extending axially between extension features 44 formed on dam 16 and extension features 46 formed on main piston 18. Main piston 18 is preloaded against return spring 42 by a snap ring 48 and return spring 42 forces main piston 18 axially away from dam 16 to limit the axial movement of piston 18.

Clutch pack 22 includes a plurality of clutch plates 50, 51, 52, 54 including outer plates 50, 51, an inner plate 52 sandwiched between outer plates 50, 51 and an end plate 54 into which outer plate 50 is axially forced to engage clutch pack 22, such that inner plate 52 is clamped by outer plates 50, 51 and main piston 18 transfers torque to clutch carrier 20. Outer plates 50, 51 and end plate 54 are held on an inner radial splined surface 56 of a clutch carrier extension 57 of main piston 18 in an axially slidable manner and inner plate 52 is held on an outer radial surface 58 of clutch carrier 20 in an axially slidable manner. A retainer in the form of a snap ring 59 is axially fixed to clutch carrier extension 57 of main piston 18 on surface 56 for limiting the axial movement of plates 50, 51, 52 away from end plate 54.

Figure 1:
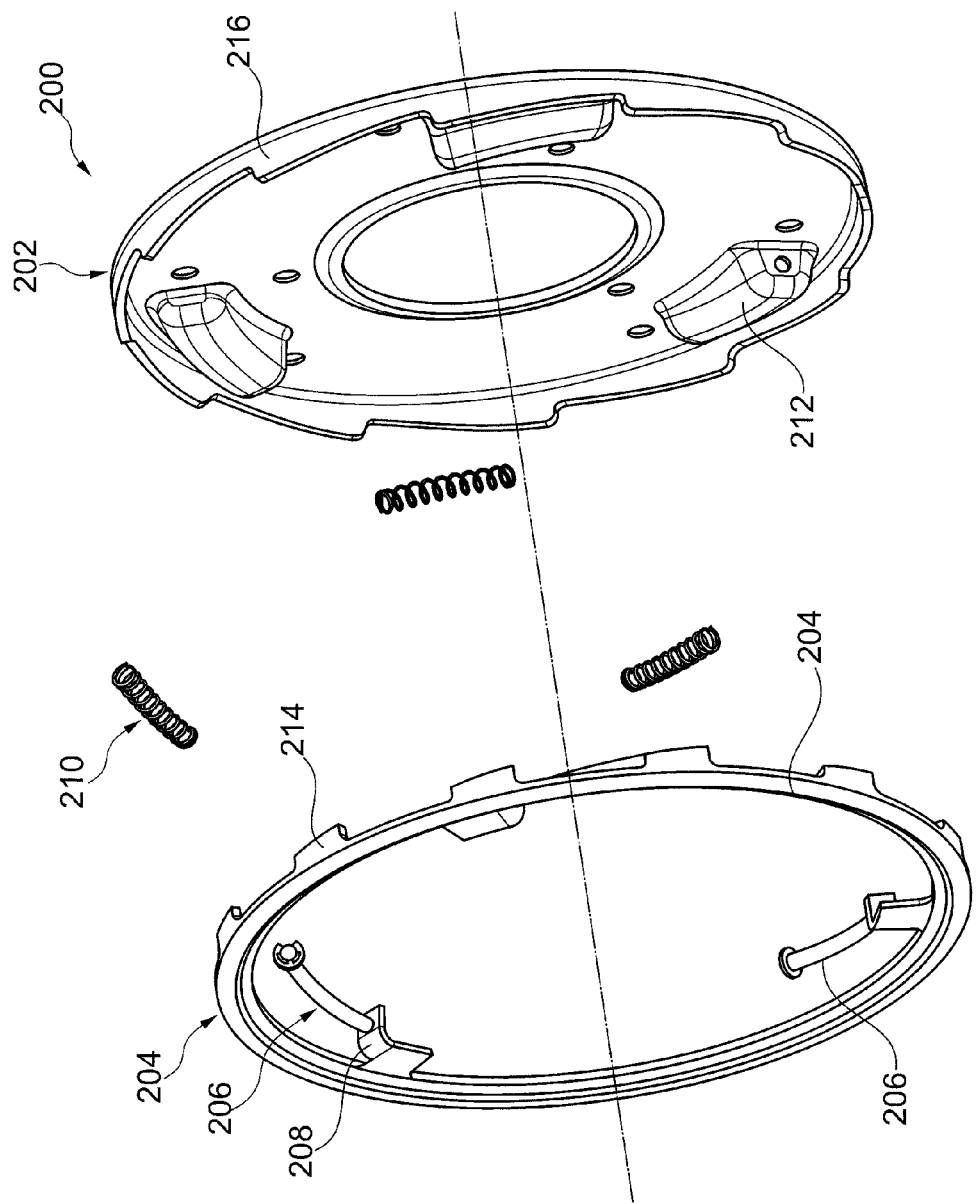
FIG. 1 shows a front perspective exploded view of a prior art clutch control assembly.

Drive assembly 10 includes a clutch control assembly 61 which operates along the same principles as the clutch control assembly 200 shown in FIG. 1 and described in U.S. Pub. 2012/0234646, and similar to the clutch control assembly 200 includes a piston or pressure plate 60, an adjuster ring 62 and rotary pistons 64. Piston plate 60 is positioned axially adjacent to main piston 18 on an axially opposite side of main piston 18 as compensation dam 16. Piston plate 60 is axially sandwiched between main piston 18 and adjuster ring 62, which interacts with piston plate 60 circumferentially and axially. Similar to adjuster ring 204 and piston plate 202, adjuster ring 62 has circumferentially and axially extending rotary pistons 64, which are configured in the same manner as rotary pistons 206, fixed thereto and extending circumferentially and axially therefrom and piston plate 60 includes belled sections 66, which are configured in the same manner as belled section 212, formed therein for receiving rotary pistons 64 and spring 68. Rotary pistons 64 may be connected to adjuster ring 62 by respective axial protrusions 70 extending axially away from adjuster ring 62 toward piston plate 60 and into respective belled sections 66. Similar to adjuster ring 204 and piston plate 202 shown in FIG. 1 and described in U.S. Pub. 2012/0234646, piston plate 60 is provided with circumferentially aligned and axially extending ramps 72, which are configured in the same manner as ramps 216, at a radial outer end 74 thereof, which interact with circumferentially aligned and axially extending ramps 76, which are configured in the same manner as ramps 214, provided at a radial outer end 78 of adjuster ring 62.

Piston plate 60 is axially fixed with respect to hub 12 by a step 63 of hub 12 and a snap ring 80 fixed in place in a groove 65 of hub 12. Piston plate 60 includes an inner radial seal 82 at an inner radial end 84 thereof for sealing inner radial end 84 at hub 12 and an outer radial seal 86 at outer radial end 74 thereof for sealing outer radial end 74 at an inner radial surface 88 of an axially extending wall 90 of main piston 18. Piston plate 60 is nonrotatably fixed with respect to hub 12 such that piston plate 60 rotates about axis 14 with hub 12 during operation of assembly 10.

Assembly 10 further includes an adjuster ring compensation dam 92 for creating a compensation pressure region 93 for adjuster ring 62 axially between compensation dam 92 and adjuster ring 62. Compensation dam 92 is axially fixed with respect to hub 12 by a step 95 of hub 12 and a snap ring 97 fixed in place in a groove 101 of hub 12. Compensation dam 92 is formed as substantially cup-shaped ring including an axially protruding wall 94 extending parallel to and radially outside of an axially extending wall 96 of adjuster ring 62. A seal 98 is provided radially between an outer radial surface 99 of axially extending wall 96 and an inner radial surface 100 of axially protruding wall 94. In this embodiment, seal 98 is held on outer radial surface 99 of axially extending wall 96 for slidingly and sealingly contacting inner radial surface 100 of axially protruding wall 94.

In order to dynamically compensate clutch control assembly 61, drive assembly 10 is configured to include three pressure regions—a main pressure region 102, a first compensation pressure region 108 and second compensation pressure region 93. A main pressure region 102, or apply chamber, is formed axially between a radially extending wall 104 of main piston 18, which extends radially between seals 24 and 30, and piston plate 60. Main pressure region 102 is accordingly sealed by seals 82, 86. The inner and outer radial sides of main pressure region 102 are formed by axially extending wall 90 of main piston 18 and hub 12. A pressure supply channel 106 formed in hub 12 provides high pressure fluid to main pressure region 102 to deflect main piston 18 axially away from piston plate 60, compressing return spring 42. A first compensation pressure region 108 is formed axially between a radially extending wall 110 of compensation dam 16 and radially extending wall 104 of main piston 18. First compensation pressure region 108 is accordingly sealed by seals 24, 30. The inner and outer radial sides of first compensation region 108 are formed by an axially extending wall 112 of compensation dam 16 and hub 12. A pressure supply channel 114 formed in hub 12 provides low pressure fluid to first compensation region 108. As discussed above, second compensation pressure region 93 is formed axially between adjuster ring 62 and compensation dam 92. A pressure supply channel 116 formed in hub 12 provides low pressure fluid to second compensation region 93. The fluid provided to first compensation region 108 and second compensation region 93 dynamically compensates for an increase in pressure in main pressure region 102 that may result from the rotation of drive assembly 10.

Similar to the clutch control assembly in U.S. Pub. 2012/0234646, when piston plate 60 is not being rotated, springs 68 urge rotary pistons 64 circumferentially, such that ramps 72, 76 extend into each other a maximum amount and piston plate 60 and adjuster ring 62 are spaced from each other a minimum distance. Rotation of piston plate 60 may then cause springs 68 to be compressed such that adjuster ring 62 is rotated with respect to piston plate 60 and a circumferential positioning between adjuster ring 62 and piston plate 60 is varied, causing ramps 76 of adjuster ring 62 to slide along ramps 72 of piston plate 60 and forcing adjuster ring 62 away from piston plate 60. Adjuster ring 62 includes a contact piston 118 at radial outer end 78 for contacting end plate 54 of clutch pack 22 and axially sliding end plate 54 along clutch carrier extension 57 of main piston 18 toward clutch plates 50, 51, 52 to close a clutch engagement gap 120 between end plate 54 and clutch plate 50. Axially extending wall 96 of adjuster ring 62 is axially slidable along axially protruding wall 94 of compensation dam 92 as engagement gap 120 of clutch pack 22 is closed. After gap 120 is closed, pressure in pressure region 102 may then axially deflect main piston 18 by overcoming a force of return spring 42 such that end plate 54 fully engages clutch pack 22. The axial deflection of main piston presses snap ring 59 against clutch plates 50, 51, 52 to force clutch plate 50 against end plate 54 such that clutch plates 50, 51, 52 are clamped between snap ring 59 and end plate 54.

Advantageously, providing adjuster ring 62 with compensation dam 92 dynamically compensates clutch control assembly 61 and prevents rotational forces of drive assembly 10 from causing fluid in main pressure region 102 from prematurely closing gap 120. As drive assembly 10 is rotated, fluid from pressure supply channels 114,116 is forced radially outward into compensation pressure regions 93, 108 such that seals 30, 98 cause a sufficient pressure buildup in compensation pressure regions 93, 108 to dynamically compensate for the increased pressure in pressure region 102, preventing premature closing of gap 120. Compensation pressure regions 93, 108 accordingly may be designed such that fluids forces in pressure region 102 resulting from the rotation of fluids drive assembly 10 do not cause main piston 18 to unintentionally engage clutch pack 22.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly for a motor vehicle drive train comprising:

a clutch pack;
a hub;
a main piston axially movable with respect to the hub to engage the clutch pack;
a clutch control assembly including a piston plate and a adjuster ring, the piston plate forming a pressure chamber with the main piston, displacement of the adjuster ring relative to the piston plate causing the clutch control assembly to close an engagement gap of the clutch pack, an increase of pressure in the pressure chamber moving the main piston axially away from the piston plate to engage the clutch pack after the engagement gap is closed.

2. The drive assembly as recited in claim 1 wherein the clutch control assembly includes at least one rotary piston rotationally coupling the piston plate and adjuster ring.

3. The drive assembly as recited in claim 2 wherein at least one of the adjuster ring and the piston plate includes at least one circumferentially aligned and axially extending ramp, rotation of the adjuster ring with respect to the piston plate causing the at least one circumferentially aligned and axially extending ramp to force the adjuster ring axially away from the piston plate to close the engagement gap of the clutch pack.

4. The drive assembly as recited in claim 3 wherein both the adjuster ring and the piston plate includes at least one circumferentially aligned and axially extending ramp, rotation of the adjuster ring with respect to the piston plate causing the at least one circumferentially aligned and axially extending ramp of the piston plate to slide along the at least one circumferentially aligned and axially extending ramp of the adjuster ring to force the adjuster ring axially away from the piston plate to close the engagement gap of the clutch pack.

5. The drive assembly as recited in claim 2 further comprising an adjuster ring compensation dam forming a compensation pressure region with the adjuster ring.

6. The drive assembly as recited in claim 5 wherein the compensation pressure region is designed to dynamically compensate for an increase in pressure in the pressure chamber caused by rotation of the drive assembly.

7. The drive assembly as recited in claim 5 wherein the adjuster ring includes an axially extending wall that axially slides along an axially protruding wall of the adjuster ring compensation dam as the engagement gap of the clutch pack is closed.

8. The drive assembly as recited in claim 1 further comprising a main compensation dam axially forming a compensation pressure region with the main piston, the main compensative dam and main piston being arranged and configured such that torque is transferred between the main piston and the main compensation dam.

9. The drive assembly as recited in claim 1 wherein the main piston includes a clutch carrier extension supporting clutch plates of the clutch pack in an axially slidable manner.

10. The drive assembly as recited in claim 1 wherein the main piston is configured to slide axially away from the clutch control assembly to engage the clutch pack.

11. The drive assembly as recited in claim 1 further comprising a retainer axially fixed to main piston, the main piston engaging the clutch pack by clamping clutch plates of the clutch pack between an end plate of the clutch pack and the retainer.

12. A drive assembly for a motor vehicle drive train comprising:

a clutch control assembly including a piston plate and an adjuster ring, rotation of the piston plate causing the adjuster ring to move axially away from the piston plate a distance; and
an adjuster ring compensation dam forming a compensation pressure region with the adjuster ring, the compensation pressure region being designed to dynamically compensate for an increase in pressure in a pressure chamber caused by rotation of the drive assembly, the pressure chamber being formed by the piston plate and a main piston.

13. The drive assembly as recited in claim 12 further comprising a seal provided radially between an axially extending wall of the adjuster ring and an axially protruding wall of the adjuster ring compensation dam.

14. The drive assembly as recited in claim 13 wherein the rotation of the piston plate causes the axially extending wall of the adjuster ring to slide axially along the axially protruding wall of the adjuster ring compensation dam at the seal.

15. The drive assembly as recited in claim 12 wherein the clutch control assembly includes at least one rotary piston rotationally coupling the piston plate and adjuster ring, at least one of the adjuster ring and the piston plate including at least one circumferentially aligned and axially extending ramp, rotation of the piston plate causing the at least one circumferentially aligned and axially extending ramp to force the adjuster ring axially away from the piston plate the distance.

16. A drive assembly for a motor vehicle drive train comprising:

a piston plate;
an adjuster ring for engaging the piston plate, at least one of the piston plate and the adjuster ring including at least one circumferentially aligned and axially extending piston ramp;
at least one rotary piston fixed to the adjuster ring, in response to a pressure applied to the piston plate and to the at least one rotary piston, the at least one rotary piston being displaceable to urge the adjuster ring in a first circumferential direction via the at least one ramp such that the adjuster ring displaces axially away from the piston plate; and
an adjuster ring compensation dam forming a compensation pressure region with the adjuster ring for controlling the axial displacement of the adjuster ring away from the piston plate.

17. The drive assembly as recited in claim 16 further comprising a clutch pack and a main piston for engaging the clutch pack, the main piston forming a pressure chamber with the piston plate, rotation of the piston plate causing the adjuster ring to close an engagement gap of the clutch pack, pressure in the pressure chamber moving the main piston to engage the clutch pack after the engagement gap is closed.

18. The drive assembly as recited in claim 17 further comprising a main compensation dam axially forming a compensation pressure region with the main piston, the main compensative dam and main piston being arranged and configured such that torque is transferred between the main piston and the main compensation dam.

19. The drive assembly as recited in claim 17 wherein the main piston includes a clutch carrier extension supporting clutch plates of the clutch pack in an axially slidable manner.

* * * * *